(12) United States Patent
Xu et al.

(10) Patent No.: US 7,872,886 B2
(45) Date of Patent: Jan. 18, 2011

(54) QUASI-PARALLEL VOLTAGE REGULATOR

(75) Inventors: Ming Xu, Blacksburg, VA (US); Julu Sun, Blacksburg, VA (US); Ya Liu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 429 days.

(21) Appl. No.: 12/034,229

(22) Filed: Feb. 20, 2008

(65) Prior Publication Data
US 2009/0206804 A1 Aug. 20, 2009

(51) Int. Cl.
*H02M 7/00* (2006.01)
(52) U.S. Cl. .......................... 363/65; 307/77
(58) Field of Classification Search ............. 363/65–72; 307/61, 63, 77, 82
See application file for complete search history.

(56) References Cited
U.S. PATENT DOCUMENTS

| | | | | |
|---|---|---|---|---|
| 5,353,215 A * | 10/1994 | Dinwiddie et al. | ............ | 363/65 |
| 6,343,026 B1 * | 1/2002 | Perry | ............ | 363/65 |
| 7,030,512 B2 * | 4/2006 | Krein | ............ | 307/77 |
| 7,071,660 B2 * | 7/2006 | Xu et al. | ............ | 323/266 |
| 7,705,490 B2 * | 4/2010 | Srinivasan et al. | ............ | 307/71 |
| 2007/0296383 A1 * | 12/2007 | Xu et al. | ............ | 323/282 |

\* cited by examiner

*Primary Examiner*—Jessica Han
(74) *Attorney, Agent, or Firm*—Whitham, Curtis, Christofferson & Cook, P.C.

(57) ABSTRACT

Improved regulation and transient response are provided by a power supply architecture providing both unregulated and regulated voltage converters in parallel but deriving input power from separate power supplies connected in series wherein regulated and unregulated branches each provide a substantially fixed and constant proportion of the output current. The series connection of input power sources may provide a further feedback mechanism in addition to feedback for regulation which enhances overall performance. As a perfecting feature of the invention, inductor-less resonant converters which are switched in an interleaved fashion may be used in the unregulated branch while substantially cancelling the characteristic large output voltage ripple thereof.

15 Claims, 14 Drawing Sheets

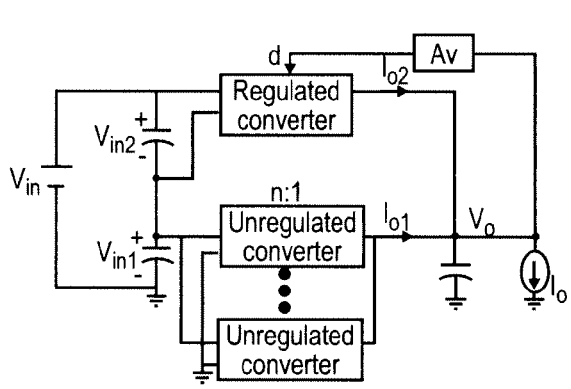
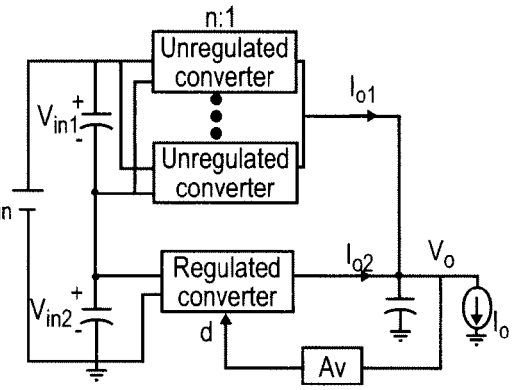
Figure 3A
Figure 3B
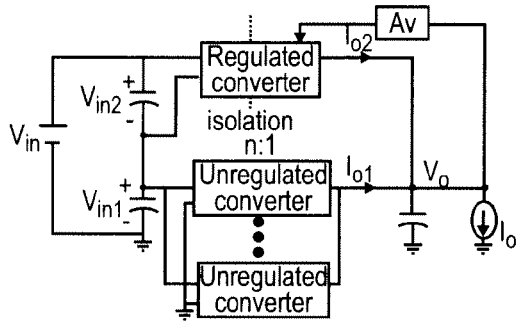
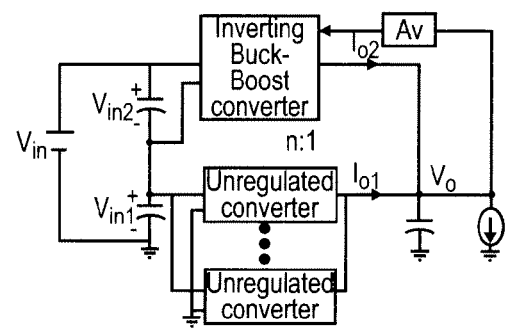
Figure 4A
Figure 4B
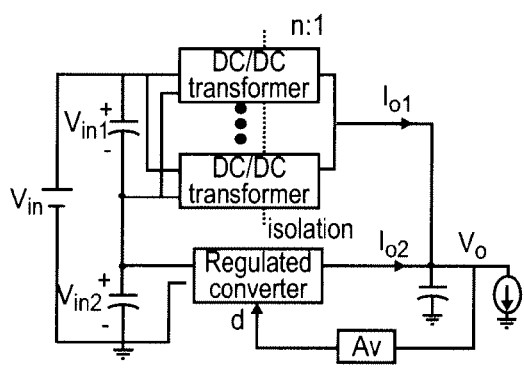
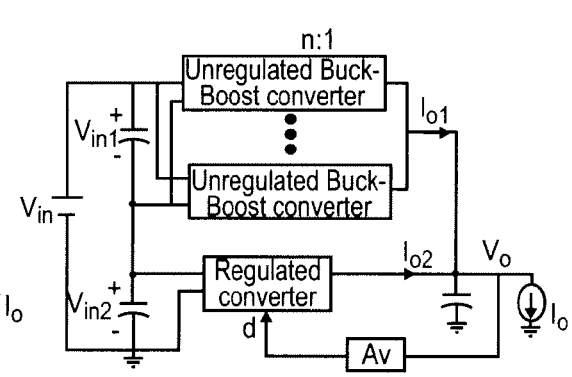
Figure 4C
Figure 4D

QUASI-PARALLEL VOLTAGE REGULATOR

BACKGROUND OF THE INVENTION

1. Field of the Invention

The present invention generally relates to voltage regulator circuits/modules and, more particularly, to providing regulated voltage to loads at high current and low voltage with fast transient load response capability and circuits capable of doing so.

2. Description of the Prior Art

Many commercially available electronic devices require power at a well-regulated, substantially constant or well-defined voltage for proper operation. Among such devices, microprocessors and other high-speed logic circuits generally present loads which are most demanding to accommodate.

Current trends in designs for microprocessors have featured increased levels of integration of circuitry on a single chip and the use of higher clock speeds. These design trends have also led to lower (e.g. one volt or less) and more stringent and/or complex voltage regulation requirements (e.g. 10% or less, possibly with specified voltage droop with increasing current to reduce power dissipation requirements) at higher currents (e.g. 130 Amperes or more) and, particularly for programmed microprocessors, extremely high current slew rates (e.g. 20 A/nsec.). High efficiency is also demanded since many microprocessor applications derive power from batteries which can limit the time of operation before the batteries become excessively discharged. Small size and weight and low cost are also very desirable, particularly for use with microprocessors.

Many of these requirements and desirable features impose conflicting constraints on design or require trade-offs which may be very difficult to accommodate. For example, accommodation of high current slew rate can be achieved with large output filter capacitance but which may compromise accurate voltage control and increase size, weight and cost of the power supply. Similarly, the requirement for lower power supply output voltages generally compromises efficiency since a lower output voltage generally increases the voltage step-down which must be achieved by a DC to DC converter while very sophisticated power supply designs are required to achieve even very small increases in efficiency. On the other hand, some voltage converter or transformer designs are known which may be of characteristically very high efficiency but cannot achieve other desired characteristics while maintaining such efficiency or presenting intractable design problems.

In order to accommodate such conflicting requirements for power supply and voltage regulator circuits, a two-stage approach as shown in FIG. 1 has been proposed which is described in detail in U.S. patent application Ser. No. 11/691,800, filed Mar. 27, 2007, and which is hereby fully incorporated by reference. In this arrangement, a first unregulated step-down converter comprises a series connection of four switching transistors Q1-Q4 with capacitors C1-C3 respectively connected across adjacent pairs of transistors. When alternate transistors (e.g. Q1 and Q3 or Q2 and Q4) are switched on while the other alternate transistors are turned off and vice-versa, capacitor C2 is alternately connected in parallel with capacitor C1 or C3 of a capacitive voltage divider to provide for DC current to be drawn therefrom with low ripple voltage while providing very high efficiency of 97% to 98%. The second stage, in series with the first stage provides one or, preferably, more switching regulators in parallel and of differing phases to minimize ripple voltage and allow the use of a relatively small output capacitor. Any topology of the individual switching regulators may be used and this configuration is not limited to the buck regulators illustrated. Such a second stage receives a reduced voltage (e.g. 5-6 volts) input from the first step-down converter stage and thus can achieve increased efficiency, depending on switching frequency, compared to a regulator having a higher voltage (e.g. 12 volts) input. However, since the two stages are in series in this design, each stage must be designed to handle the full power load and thus efficiency is compromised during operation at low load which, for microprocessors in particular, can be a substantial fraction of the total operating time.

A proposal to reduce this compromise of efficiency is illustrated in FIG. 2. The basic principle of this proposed design is to provide a plurality of unregulated power supplies and a single regulated power supply in parallel such that the predominant portion of the power to the load is supplied by the high efficiency unregulated converters (each preferably operating as class-E inverter plus rectifier which achieves a high output impedance and thus functions as a current source) and regulating the output voltage while delivering only a small portion of the total power from the regulated cell which may comprise either a switched or linear regulator having a low output impedance in order to control the dynamics of the system. Since the regulated cell supplies only a very small portion of the total power at steady state, high efficiency requires that it be designed to deliver only low power. Consequently, the fully parallel power supply architecture of FIG. 2 cannot accommodate rapid load transients and high current slew rates which are typical of loads presented by microprocessors.

Thus, in summary, while many voltage regulator topologies are known and power supply architectures have become quite sophisticated, such designs are far from ideal for the types of loads presented by some current and foreseeable applications, particularly those including microprocessors. The effects of trade-offs necessary to accommodate the many demands of such applications are particularly severe and increasing in severity as present trends in integrated circuit designs continue. It can be foreseen that current power supply architectures and design approaches such as those shown in FIGS. 1 and 2 (neither of which is admitted to be prior art in regard to the present invention) will become unacceptable in the very near future.

SUMMARY OF THE INVENTION

It is therefore an object of the present invention to provide a power supply architecture which can provide high current at low and well-regulated voltage while accommodating large load transients and providing high current slew rate and which can be realized at small size and weight at low cost.

It is another object of the invention to provide a power supply architecture which allows use of particularly high efficiency unregulated voltage converter/transformer topologies which cannot maintain high efficiency under particular operating conditions or while developing particular desired characteristics or otherwise presenting particularly intractable problems of design or operation.

In order to accomplish these and other objects of the invention, a voltage regulator circuit architecture is provided including a regulated branch including at least one regulated voltage converter, an unregulated branch including at least one unregulated voltage converter having a lower output impedance than the regulated branch, the unregulated branch being connected in parallel with the regulated branch, wherein output impedances of the regulated branch and the unregulated branch determine a proportionate load current delivered to a load from each branch, and two power supplies, a first power supply supplying input power to the regulated branch and a second power supply supplying input power to the unregulated branch and connected such that variation in input voltage to the unregulated branch due to load current supplied therefrom provides feedback to the regulated branch for voltage regulation of the output voltage of the voltage regulator circuit.

In accordance with another aspect of the invention, a method of regulating voltage of a power supply is provided including steps of providing power to an unregulated voltage converter from a first source such that increased load causes reduced voltage of the first source in series with a second source, providing power to a regulated voltage converter from the second source or a third source, and adjusting an input or output voltage of the regulated voltage source to compensate for the reduced voltage whereby an output voltage of the power supply is regulated.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A and 3B are equivalent block diagrams of a quasi-parallel voltage regulator architecture in accordance with the invention, FIGS. 4A, 4B, 4C and 4D are block diagrams of four exemplary implementations of a quasi-parallel voltage regulator architecture in accordance with the invention.

DETAILED DESCRIPTION OF A PREFERRED EMBODIMENT OF THE INVENTION

Figure 1:
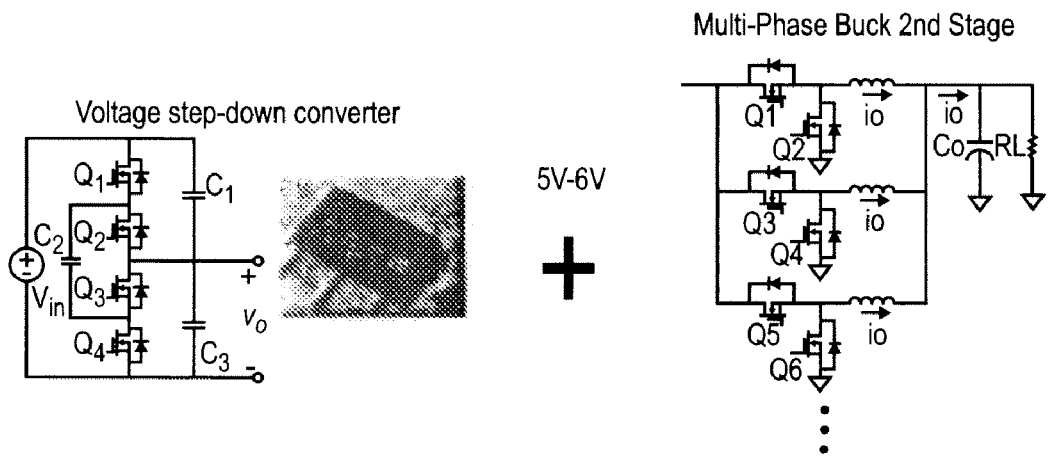
FIG. 1 is a block diagram of a proposed two stage power supply.

Referring now to the drawings, and more particularly to FIGS. 3A and 3B, block diagrams of the quasi-parallel architecture of a voltage regulator in accordance with the invention are shown. The circuit topologies shown in FIGS. 3A and 3B are identical; FIG. 3B being inverted top-to-bottom relative to FIG. 3A. It will be immediately recognized that the circuit architecture of FIGS. 3A and 3B differs from that of FIG. 1 in that the unregulated converters or cells are connected in parallel rather than in series, much in the fashion illustrated in FIG. 2. However, as compared with FIG. 2, the circuit architecture of the invention further differs from a fully parallel architecture such as that of FIG. 2 by supplying the input to the regulated and unregulated converters or cells from capacitors which are connected in series across the input voltage source Vin and thus function as two separate input sources providing voltages which are generally unequal but which total Vin. As will be discussed in greater detail below, such a series connection of two input voltage source provides an important voltage regulation feedback mechanism (in addition to the feedback loop to d containing amplifier Av which will be readily understood by those skilled in the art) as well as improving efficiency of the voltage regulator, as will also be discussed in greater detail below.

Figure 2:
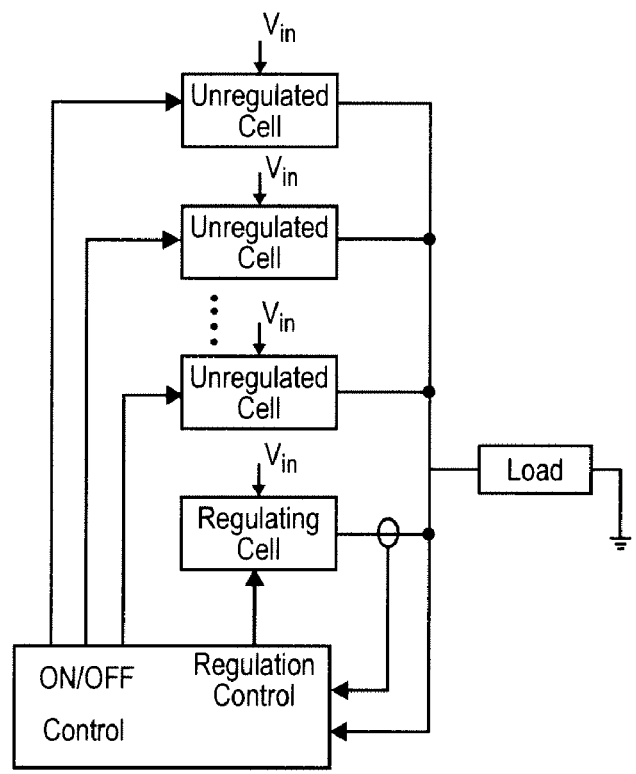
FIG. 2 is a block diagram of a proposed parallel power supply architecture.

(Since the input power sources are independent and involve separate voltages in series, the nomenclature "quasi-parallel architecture" is used somewhat more generically to indicate divergence from fully parallel architectures such as that of FIG. 2 and to indicate that such an additional feedback mechanism is presented which allows voltage regulation to be obtained while providing the predominant portion of output current from unregulated converters. By the same token, the nomenclature "Sigma architecture" is sometimes used to denote the same characteristics and which is appropriate since output current is the summation of output currents of both regulated and unregulated converters.)

Somewhat less evidently from FIGS. 3A and 3B but important to the practice of the invention, the unregulated cells are so constituted as to achieve relatively low output impedance and the regulated converter is designed to have a higher output impedance than the unregulated converters whereas in the architecture of FIG. 2, the opposite relationship of output impedances is necessary (e.g. in FIG. 2 the output impedances of the unregulated cells is higher than that of the regulated cell). The relatively higher output impedance of the regulated converter in the circuit of FIGS. 3A and 3B assures that unregulated converters process most of the load power whether at steady state or during load transients. All of the converters, whether regulated or unregulated, can be treated as voltage sources, whereas the unregulated cells function as current sources in the architecture of FIG. 2.

It should also be appreciated that the quasi-parallel architecture of the invention allows different types of circuits to be used for each of the regulated and unregulated cells. Four exemplary embodiments which provide proper operation and are differently constituted are illustrated in FIGS. 4A-4D. Specifically, FIG. 4A is constituted by regulated and unregulated DC/DC converters which may be of any known or foreseeable design. In FIG. 4B, the unregulated converters are constituted by DC/DC transformers. (DC/DC transformers differ from DC/DC converters by omitting closed loop output voltage control or regulation. The ratio of input to output voltages of an unregulated converter is denoted by "n" much in the nature of, but not necessarily indicating a turns ratio of an actual transformer which may or may not be included in a give voltage transformer design.) In FIG. 4C, the regulated converter is constituted by, for example, an inverting buck-boost converter. In FIG. 4D, the unregulated cells are constituted by unregulated buck-boost converters. Any structures for regulated or unregulated cells in any of FIGS. 4A-4D or other structure having corresponding functions may be substituted for corresponding cells in others of these Figures. For example, as shown in FIG. 5, in regard to which some principle of design of circuits in regard to the invention will be discussed, an 8:1 DC/DC voltage transformer (DCX), such as a pulse width modulated half bridge operating at a 50% duty cycle, an LLC resonant converter operating at a constant resonant point or, preferably, as a perfecting feature of the invention, a novel inductor-less resonant converter as will be described in detail below, is used as the unregulated cell or branch while a simple buck converter is used as the regulated cell or branch.

Figure 5:
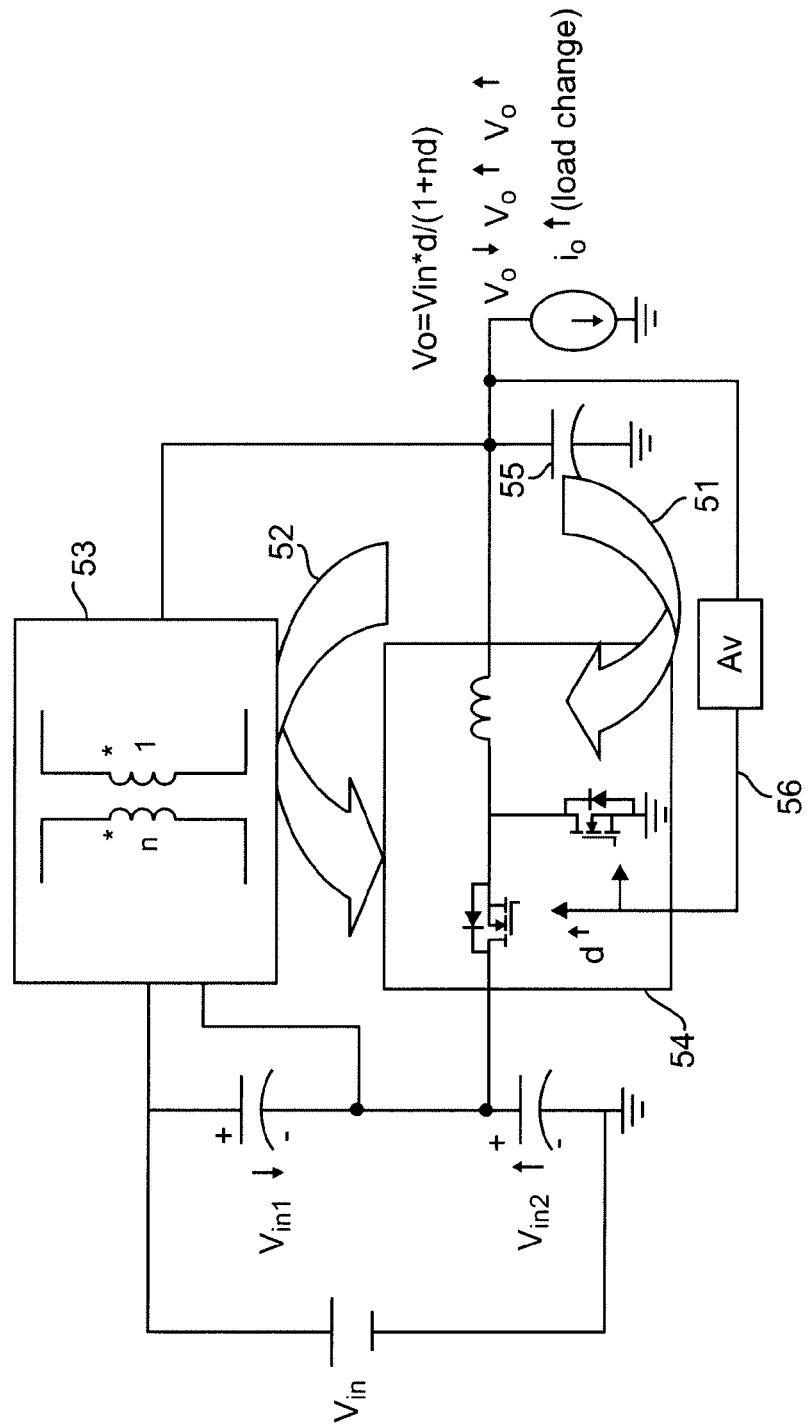
FIG. 5 is a block diagram suitable for conveying an understanding of the mechanisms of voltage regulation in a quasi-parallel voltage regulator architecture in accordance with the invention.

As alluded to above, a feedback loop including an amplifier or other gain control, Av, is provided to control the duty cycles of the switches in the regulated converter in a manner well-understood by those skilled in the art and depicted by arrow 51 in FIG. 5. Somewhat less evident is a second feedback mechanism depicted by arrow 52 in FIG. 5 due to the series connection of the capacitors forming the serially connected input power sources for the regulated and unregulated cells, respectively. This feedback mechanism insures that the proportions of load current delivered by the regulated and unregulated branches remains substantially constant regardless of steady-state load and varies only slightly during load transients as well as assisting in output voltage regulation and, synergistically, improving the transient response of the regulated branch of the voltage regulator in accordance with the invention. It will be recalled from the foregoing that the unregulated branch, which may include a plurality of parallel-connected unregulated converters, collectively indicated at 53, is arranged to have a lower output impedance than the regulated branch 54. Thus, upon an increase in the load current, io, which tends to pull down the voltage Vo as transient load current is drawn from the output capacitor 55 (if provided), the duty cycle, d, determined by feedback path 56 will increase. At the same time, the unregulated branch 53 will tend to supply a greater proportion of the load current due to its comparatively lower impedance and thus tend to draw down voltage Vin1. Since Vin1+Vin2=Vin, Vin2 will increase and increase the current through the regulated branch 54 which will also be seeking to increase its duty cycle, d. The transient response of the regulated branch 54 will therefore be more rapid than the limits otherwise imposed by the feedback path 56, tending to rapidly increase Vo to supplement the increase in Vo due to the injection of current from the low impedance unregulated branch 53, which is limited by Vin1 (which falls slightly upon a transient load increase) and then regulated in the usual manner by feedback path 56. The opposite responses would occur in response to a transient decrease in the load current. Therefore, stability of the voltage regulator following a load transient can be recovered very rapidly and the proportion of current provided by the regulated and unregulated branches is maintained with only slight and very brief perturbations and the overall relationship of input and output voltages given by $$Vo = Vin \cdot d/(1+nd)$$

is accurately maintained.

In summary, when the load current increases ($i_o\uparrow$), Vo is drawn down ($V_o\downarrow$). Since the unregulated branch 53 is of lower impedance than regulated branch 54, Vin1 is also drawn down (Vin1$\downarrow$) causing an increase in Vin2 (Vin2$\uparrow$) which, in turn, causes Vo to rise (center $V_o\uparrow$ symbol) as feedback mechanism 52. Feedback mechanism 51 responds to $V_o\downarrow$ through feedback connection 56 by increasing the duty cycle (d$\uparrow$) which also increases Vo (right-most $V_o\uparrow$ symbol) in a manner familiar to those skilled in the art.

Figure 6:
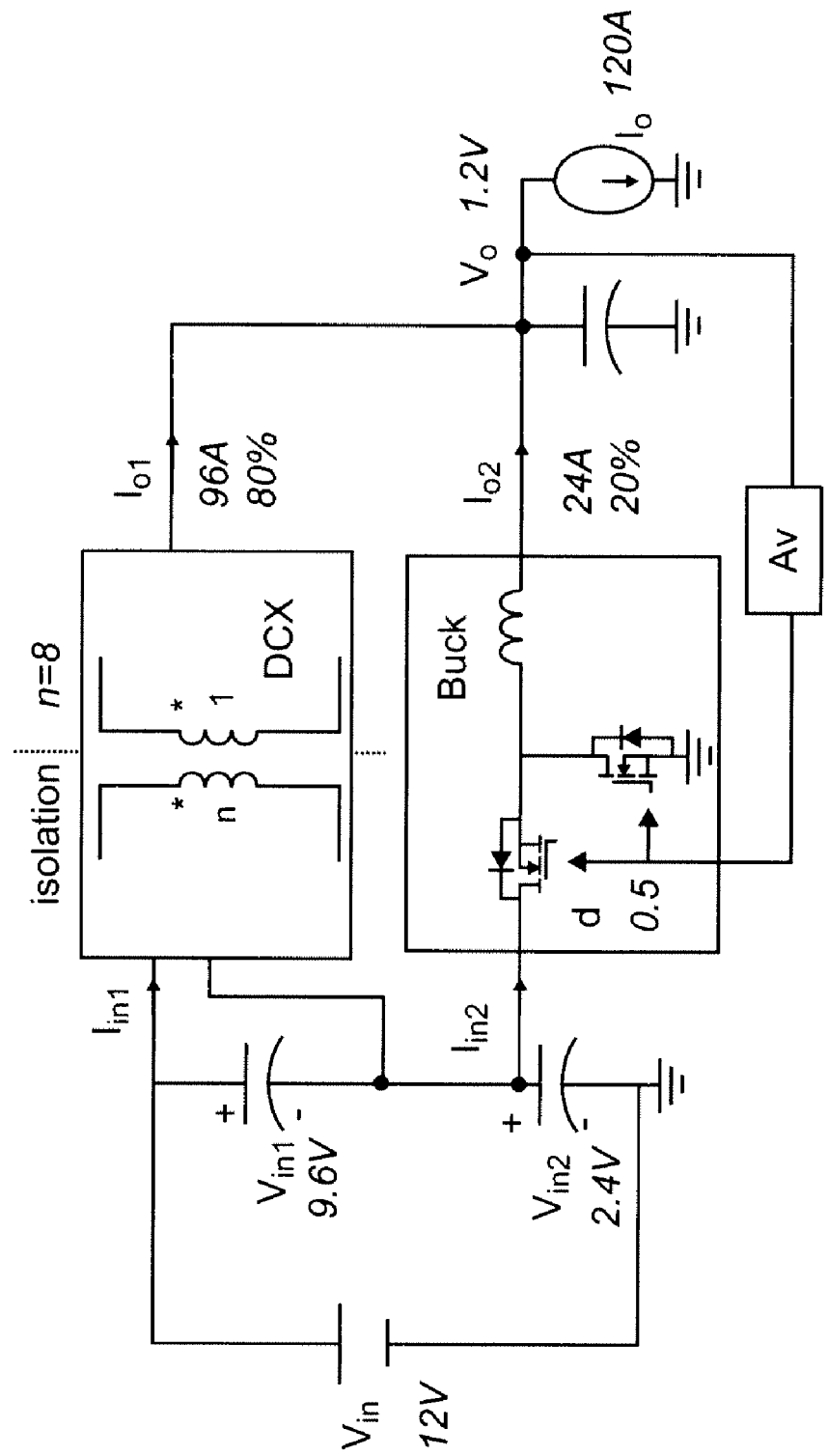
FIG. 6 is a block diagram of a quasi-parallel voltage regulator architecture in accordance with the invention and which is useful for conveying an understanding of basic principles in the design of practical implementations of the invention.

More specifically, as an example of principles of circuit design in accordance with the quasi-parallel architecture of the invention, those skilled in the art will observe that:

1.) Vin1+Vin2=Vin with the series connected capacitors functioning as a capacitive voltage divider;

2.) it follows from the function of the capacitive voltage divider that Iin1=Iin2 (since the return current of the input of the DC/DC transformer supplies Iin2);

3.) the input voltages can be designed by the relationships n:Vin1=nVo, and Vin2=Vin−nVo; and 4.) the current (power) ratio is determined by Io1/Io2=Vin1/Vin2. Thus, in the particular example of FIG. 5 illustrated in FIG. 6, n=8 and the voltages and currents indicated satisfy the above relationships. More generally, by designing the gain of DC/DC transformer(s), the power ratio of the regulated and unregulated branches can be controlled. In the example of FIG. 5, the unregulated cell supplies 80% of the load current while the regulated cell supplies 20% which will stay substantially constant during steady state operation regardless of load current and will vary only slightly and very briefly during load transients as the two feedback mechanisms described above stabilize the circuit. Any desired apportionment of load current between regulated and unregulated branches may be achieved to maximize efficiency of both branches for anticipated loads and load changes.

The benefits of the quasi-parallel architecture are principally in efficiency and output capacitance reduction. In regard to efficiency, a state-of-the-art multi-phase buck converter providing power to a typical microprocessor will have an efficiency of about 86% at a switching frequency of 600 KHz. In comparison, efficiency of a DC/DC transformer (DCX) is generally about 93% while efficiency of a single or multi-phase buck converter can be increased to about 91% because of the reduction of input voltage allowed by the reduction of current required therefrom. Thus, the overall efficiency of the quasi-parallel architecture in accordance with the invention is about 92.5%; 6% to 7% higher than a state-of-the-art voltage regulator.

Figure 7:
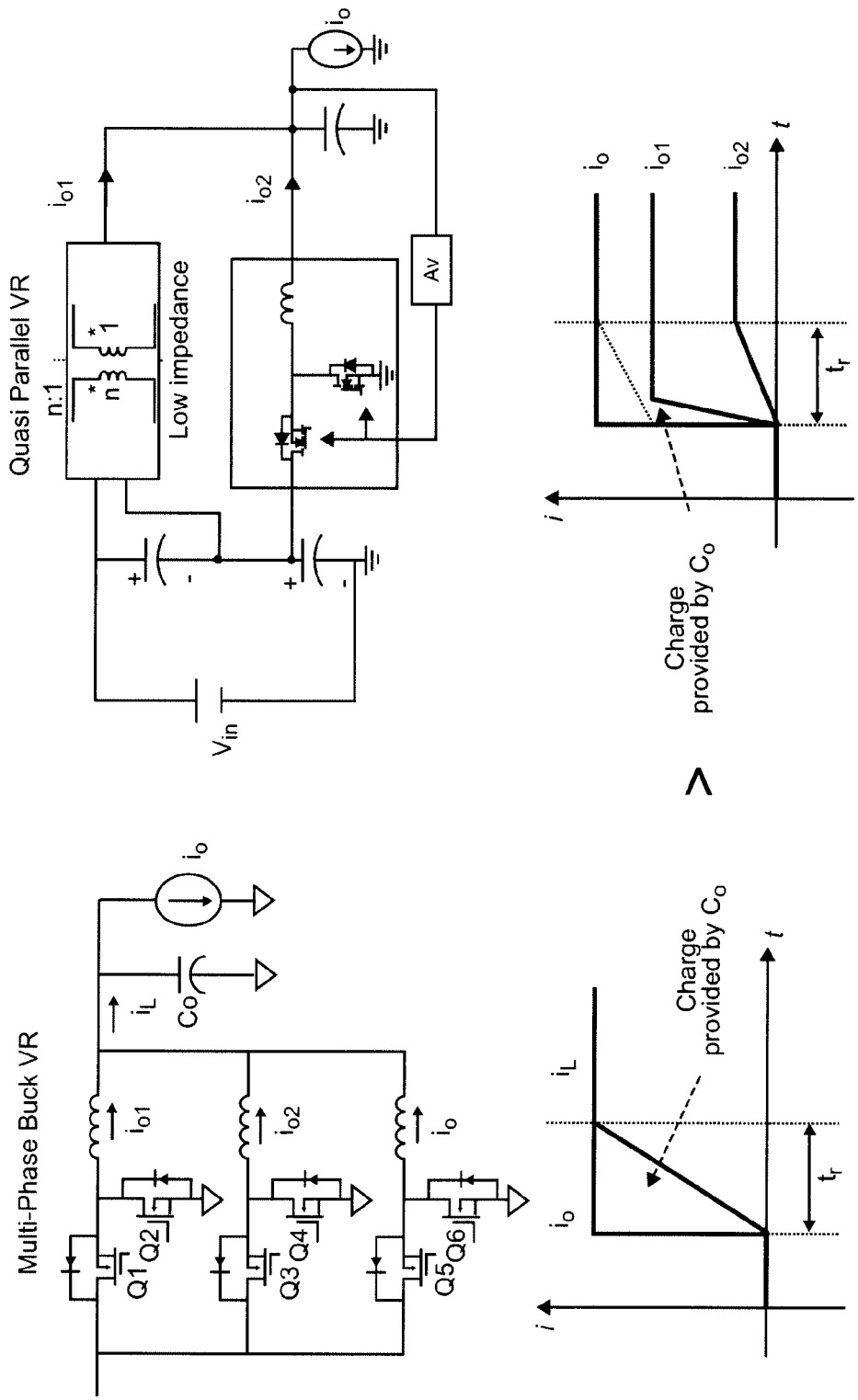
FIG. 7 illustrates the improvement in transient response of the voltage regulator architecture in accordance with the invention.
Figure 8:
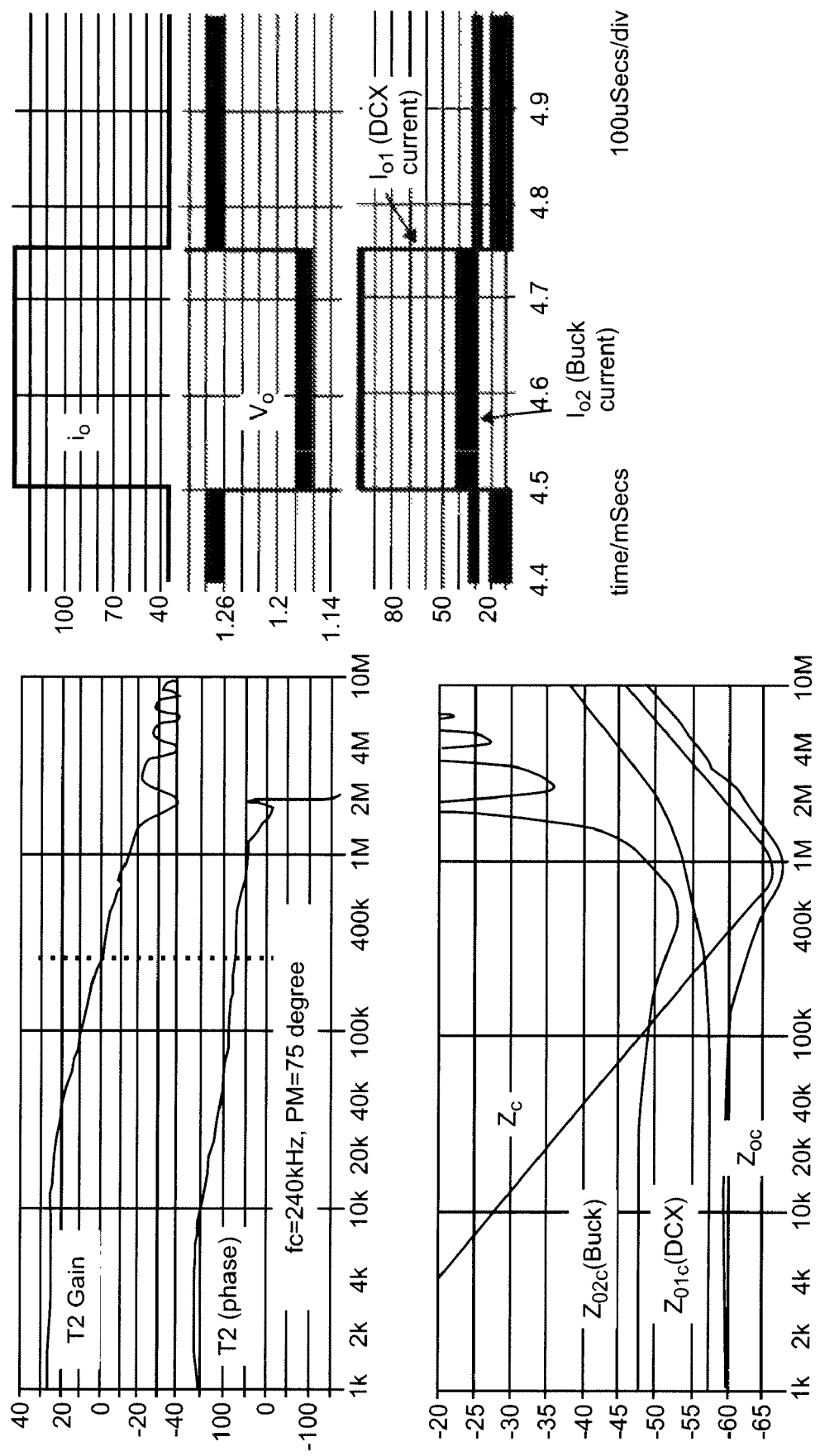
FIG. 8 illustrates the benefits of the invention in regard to reduction or elimination of output filter capacitor requirements.
Figure 9B:
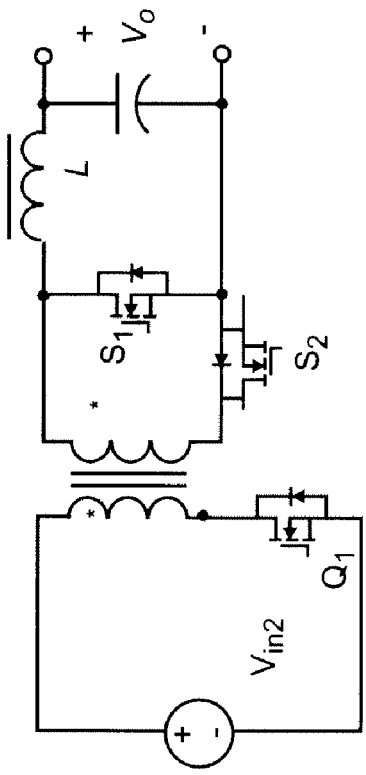
FIGS. 9A, 9B, 9C, 9D and 9E are exemplary converter topologies usable in implementations of the invention.
Figure 9A:
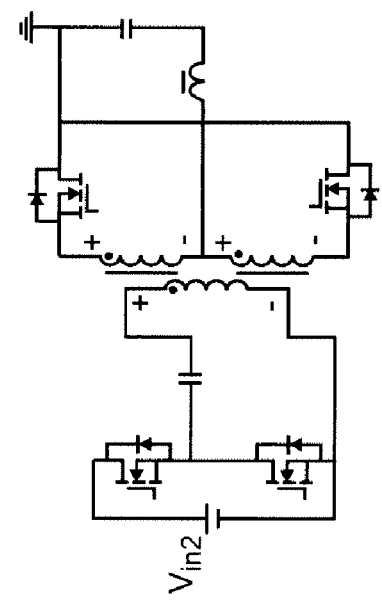
Figure 9E:
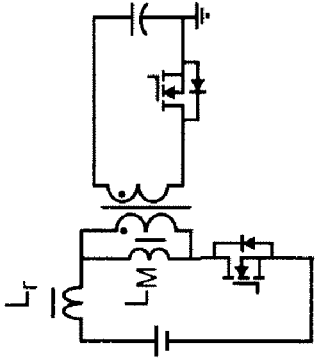
Figure 9D:
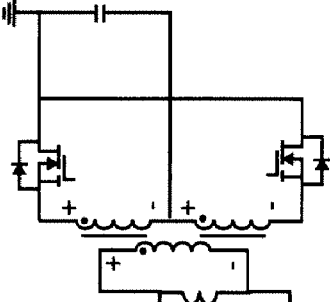
Figure 9C:
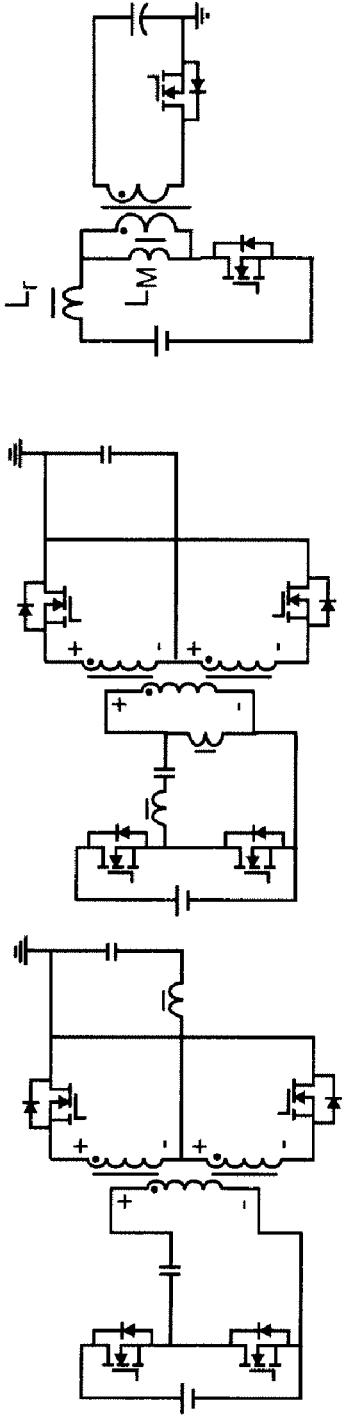

The reduction of output capacitance is also much improved in comparison with a state-of-the-art multi-phase buck converter, as shown in FIG. 7. As shown at the left side of FIG. 7, the current required to accommodate a rapid load transient beyond that which can be delivered from a multi-phase buck (or other topology) converter must be supplied from the charge on an output bulk (filter) capacitor Co. However, as shown at the right side of FIG. 7, the low output capacitance of the DCX cell or branch provides improved transient response for the portion ($i_o1$) of load current which is to be supplied by the DCX or unregulated cell; greatly reducing the charge which must be supplied from the bulk capacitor during a load transient. By the same token, the deficiency of the regulated cell to meet a required transient load current (due to the relatively slow rise time of $i_o2$) may be reduced by the proportion of the load current allocated to the unregulated cell or branch (e.g. 80% in the example of FIG. 6). Depending on required voltage regulation accuracy or tolerance, if both the DCX and buck converter are run at 600 KHz and a 1 mohm voltage droop is provided, bulk capacitors can be eliminated within current voltage regulation tolerances for microprocessors by the use of the quasi-parallel architecture of the invention while a state-of-the-art multi-phase buck converter requires at least 500 μf of capacitance to meet the same transient requirements. As shown in FIG. 8, perfect AVP waveforms are achieved by the quasi parallel architecture in accordance with the invention without use of any bulk capacitance. Thus, in comparison with, for example, a multi-phase buck converter as shown in FIG. 7 the output/filter capacitor requirement is reduced by about 500 μF for the same magnitude of load transient.

It should be appreciated that the embodiments of the invention discussed above and as illustrated in FIGS. 3-6 do not provide isolation of the output from the input, which may be needed for the regulated cell, the unregulated cell or both in some applications. As will be appreciated by those skilled in the art, isolation can be performed in a number of known ways at the ultimate input (e.g. in a front end prior to the DC voltage source Vin) or in the regulated or unregulated cells themselves. Examples of different types of isolated regulated and unregulated cells are illustrated in FIGS. 9A-9E. A flyback converter topology, familiar to those skilled in the art, may also be used.

Figure 10A:
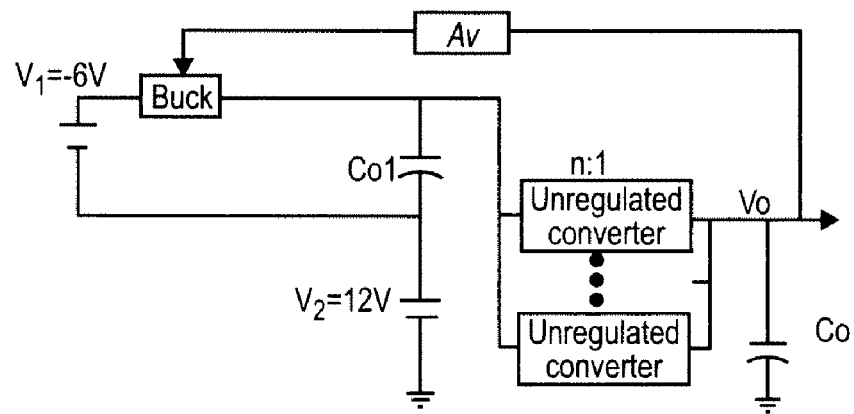
FIG. 10A is a block diagram of a variant form of the quasi-parallel architecture in accordance with the invention.
Figure 10B:
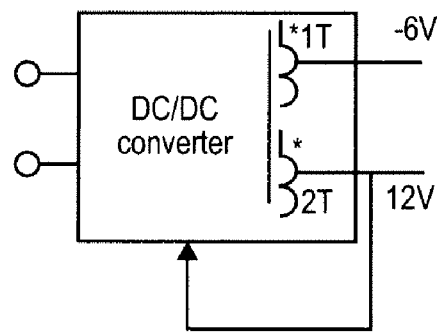
FIG. 10B illustrates a realization of two isolated input voltage sources in a front-end converter useful in some applications of the invention and the variant form thereof of FIG. 10A.

As a variation of the quasi-parallel architecture described above, a block diagram of an alternative circuit structure is illustrated in FIG. 10A. This structure also embodies the concept of using both regulated and unregulated converters and the series connection of input voltages provided by V2 and Co but places the regulator on the input side of the unregulated converters with its own low voltage source, V1, where Vin of embodiments described above is divided into V1 and V2 and no capacitive voltage divider is required. This structure requires that the input voltage sources V1 and V2 be isolated and which can be easily achieved with front end converters such as is schematically shown in FIG. 10B. The DC/DC converter can be any type of pulse width modulated converter or many known types of resonant converter.

The feedback path including amplifier Av from the output to the regulated converter (in this case, a buck converter but other topologies could be used) is essentially the same as in the previously described embodiments. However, in this circuit structure, all current to the load is directly provided from the high efficiency unregulated converters and regulation is achieved by adjustment of the input voltage thereto by use of the regulated converter which adjusts the voltage on Co1. While the second feedback mechanism described above is not present in this configuration, transient response is at least equal to that of the unregulated converters which is enhanced somewhat by the fact that the Co may be small and the transient response of Vo1 thereon may be very rapid to alter the voltage increment above V2 to enhance the transient response of the unregulated converters. That is, an increase in Vo1 will cause the output voltage vo to rise and reduce the duty cycle of the converter to reduce and stabilize Vo1 and thus regulate the output voltage Vo. While an increase in Vo1 may increase the output voltage of the unregulated converters, such voltage increase enhances the injection of current to output filter capacitor Co which can readily filter such voltage increase while being capable of reduction in capacitance and size.

Figure 11:
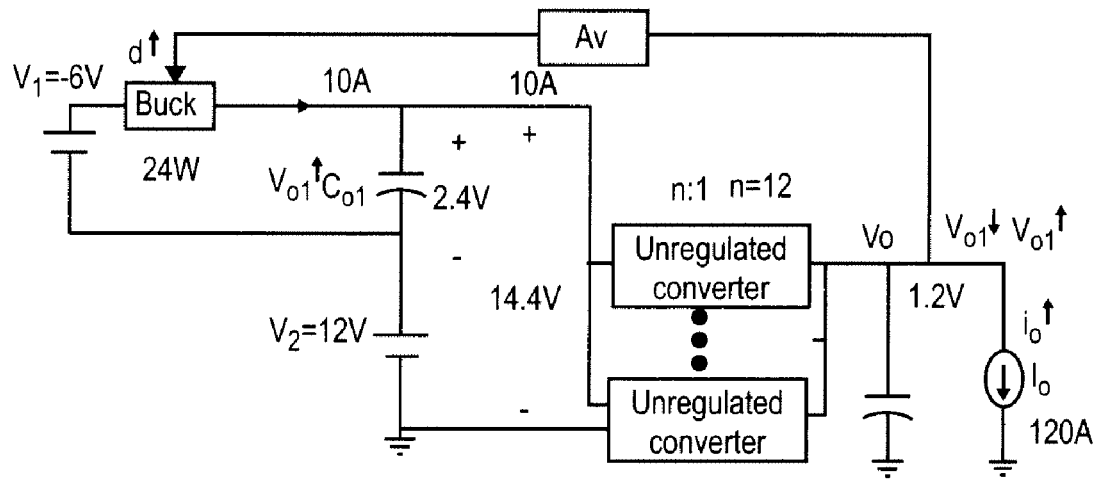
FIG. 11 is a design example of the variant form of the invention of FIG. 10A, FIGS. 12A, 12B, 12C and 12D are schematic illustrations of exemplary suitable unregulated voltage converter circuits usable in the invention.

A design example of the structure of FIG. 10A is illustrated in FIG. 11. In this case, the regulated converter need only be designed to deliver 24 Watts of output power in order to deliver 144 Watts to the load. The efficiency of the regulated buck converter can be very high since the input voltage thereto is only required to be about 6 Volts instead of the more typical 12 Volts while the amount of power supplied by the regulated converter (24 Watts) is similar to the example of FIG. 6. Therefore, the configuration of FIGS. 10A and 11 is very similar in requirements for power handling of the regulated and unregulated converters to the basic embodiment of FIGS. 5 and 6 as discussed above. The estimated efficiency of this structure is about 92%, assuming 93% efficiency for the unregulated converters and 90% efficiency for the regulated converter. This structure can also achieve a very fast transient response since all of the output current is supplied from unregulated converters (e.g. the transient response time is not compromised by the relatively slower slew rate of the regulated converter) which can therefore also reduce or eliminate output or filter capacitance (Co) requirements.

Figure 12B:
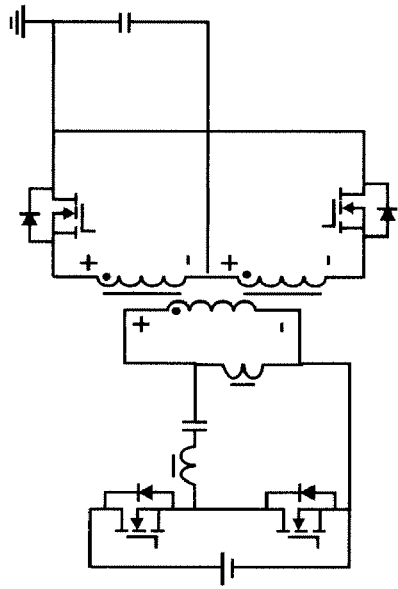

As a perfecting feature of the invention which has been found to be very desirable in implementation of the quasi-parallel architecture described above but not necessary to its successful practice, an inductor-less resonant DC/DC converter which is particularly advantageous for use as unregulated converters will now be discussed. Referring now to FIGS. 12A-12D, it will be recalled from the foregoing that many different types of circuits can be used as unregulated converters. For example, a pulse width modulated (PWM) soft switching DCX is illustrated in FIG. 12A which is suitable for practice of the invention. However, such PWM converters cannot achieve extremely high efficiency, especially at high switching frequencies preferred for most efficient practice of the invention due to the relatively high switching losses they exhibit. To avoid such switching losses, an LLC resonant converter, a half bridge configuration of which is shown in FIG. 12B, and an inductor-less resonant converter as shown in FIG. 12C has been proposed which, compared to the PWM converter of FIG. 12A, can achieve zero voltage switching (ZVS) operation and near zero current switching (ZCS) operation. Moreover, there are no body diode related switching losses for the synchronous rectifiers. Thus relatively higher efficiency can be achieved from resonant converters compared to PWM converters. Of these latter configurations, the inductor-less converter is very suitable for the first stage of the two-stage approach discussed above with reference to FIG. 1. However, this topology is not suitable for point of load (POL) converters due principally to the high output voltage ripple it exhibits. That is, since $Lr=Lk/n^2$ (e.g. Lk reflected to the secondary side) resonates with a small Co, a very large output ripple (e.g. 0.44 V for a 1.2 V output voltage) may be observed for the half bridge and other (e.g. full bridge, push-pull, and the like) configurations of this circuit including the forward reset configuration illustrated in FIG. 12D which is preferred for implementation of this perfecting feature of the invention. While this output voltage ripple can be attenuated somewhat by adding an LC low pass filter, such a solution has the drawbacks of increased circuit footprint, increased cost and larger output impedance which compromises transient response and current slew rate as well as efficiency.

Operation of the preferred circuit of FIG. 12D will now be explained with reference to FIG. 13 in which an exemplary schematic diagram and equivalent circuits during different time periods of cyclic operation are provided on the left side and resulting waveforms during corresponding periods of cyclic operation are illustrated on the right side. Both switches Q1 and S1 are preferably operated in phase as shown in the uppermost waveform. During time period t0-t1, Q1 and S1 are "on" and conductive and are "off" at other times. When Q1 and S1 are turned "on", current increases rapidly and a voltage is developed across leakage inductance Lk of the transformer and the parallel connection of the mutual inductance of the transformer coils and the reflected capacitance ($Co/n^2$) of the output capacitor Co. As this voltage increases, current Ip peaks and decreases, approaching zero at time t1 when Q1 and S1 can be turned off. Is1 will exhibit a similar waveform. It should be noted that Q1 current ($i_p$) will be near zero while actual ZCS will be achieved for S1.

During the period t1-t2 when Q1 and S1 are "off", the leakage inductance and mutual of the transformer resonates with Cr, which is constituted by the reflected output capacitance (e.g. $Co/n^2$), developing a small current variation on the primary side of the transformer and a half-sinusoid voltage waveform across Q1. A similar voltage waveform results across S1. Both of these waveforms return to zero volts at t2 and the circuit is reset after delivering current to Co during t0-t1. Period t2-t3 is essentially dead time and can be very short but some finite period is desirable to prevent reverse current in the secondary side of the circuit while ip is in a negative portion of its resonant oscillation. During this period, $I_{LM}$ ($=i_p$) is negative and the actual current is in the direction in which the illustrated diode is oriented.

Figure 14:
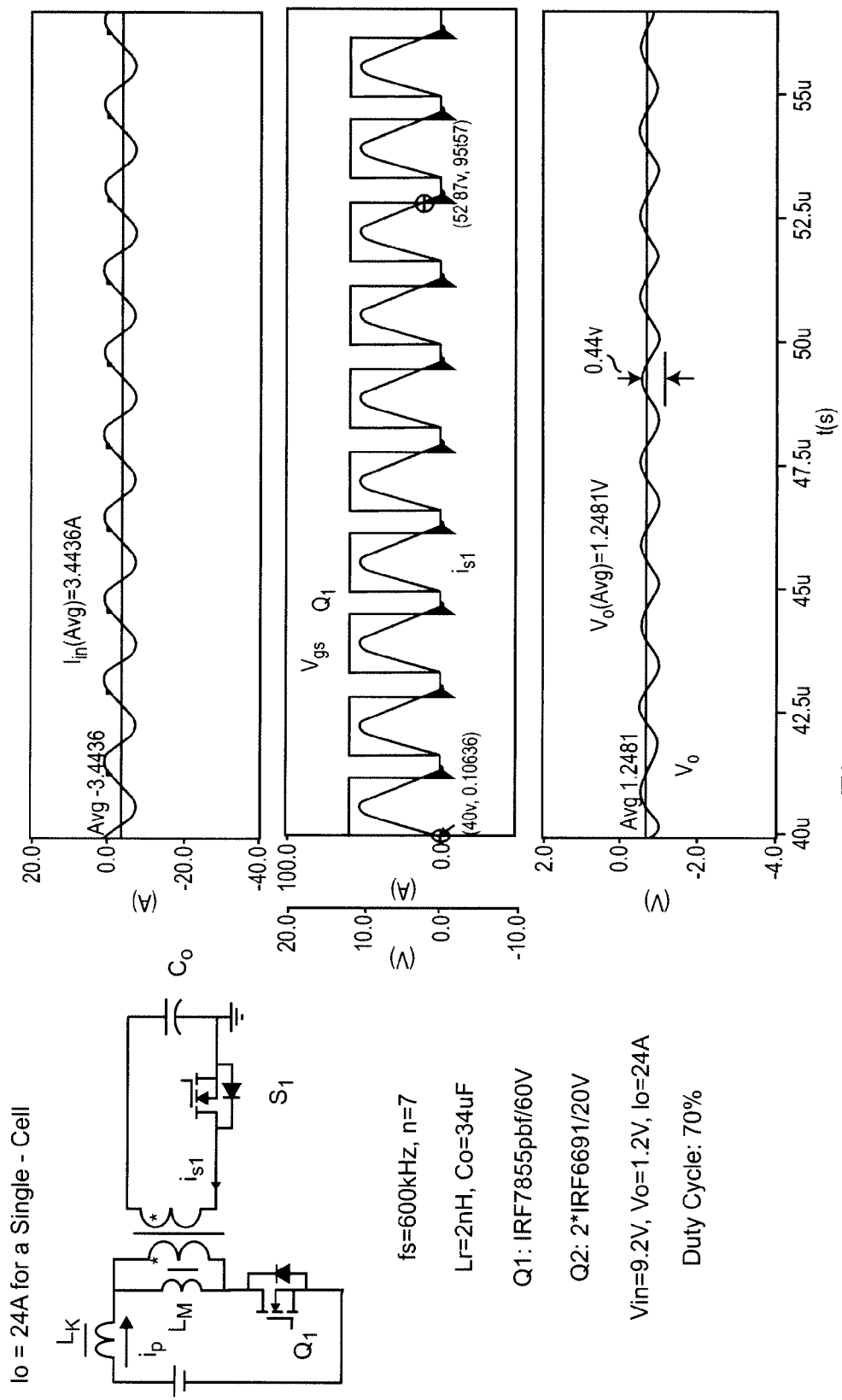
FIG. 14 illustrates the potential efficiency and characteristic high ripple voltage of the circuit of FIG. 12D, FIG. 15 illustrate cancellation of the characteristic ripple using interleaved, parallel connected circuits in accordance with FIG. 12D.

A particular embodiment of this circuit with simulated voltage and current curves is illustrated in FIG. 14. For a switching frequency of 600 KHz, n=7, Lr=2 nH, Co=34 µF, Vin=9.2V, Vo=0.2V and Io=24 A. When operated at a 70% duty cycle the estimated efficiency is estimated to be about 93%. However, it can be seen that the secondary current is a train of separated near half-sinusoid pulses and results in a Vo having about a 20% ripple about its average of 1.2481 volts or a peak-to-peak ripple of about 0.44 volts due to Lr resonating with a relatively small Co. As indicated above, while such a ripple voltage could, in theory, be filtered, such filtering would compromise the transient response of the circuit.

Figure 12D:
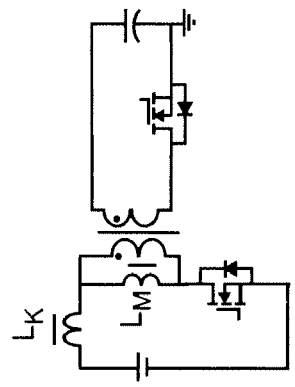
Figure 12A:
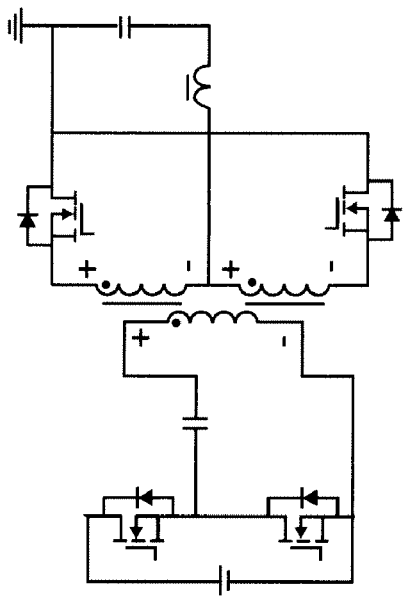
Figure 12C:
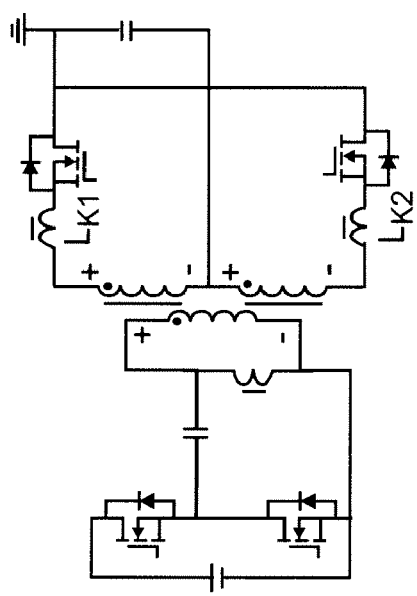
Figure 13:
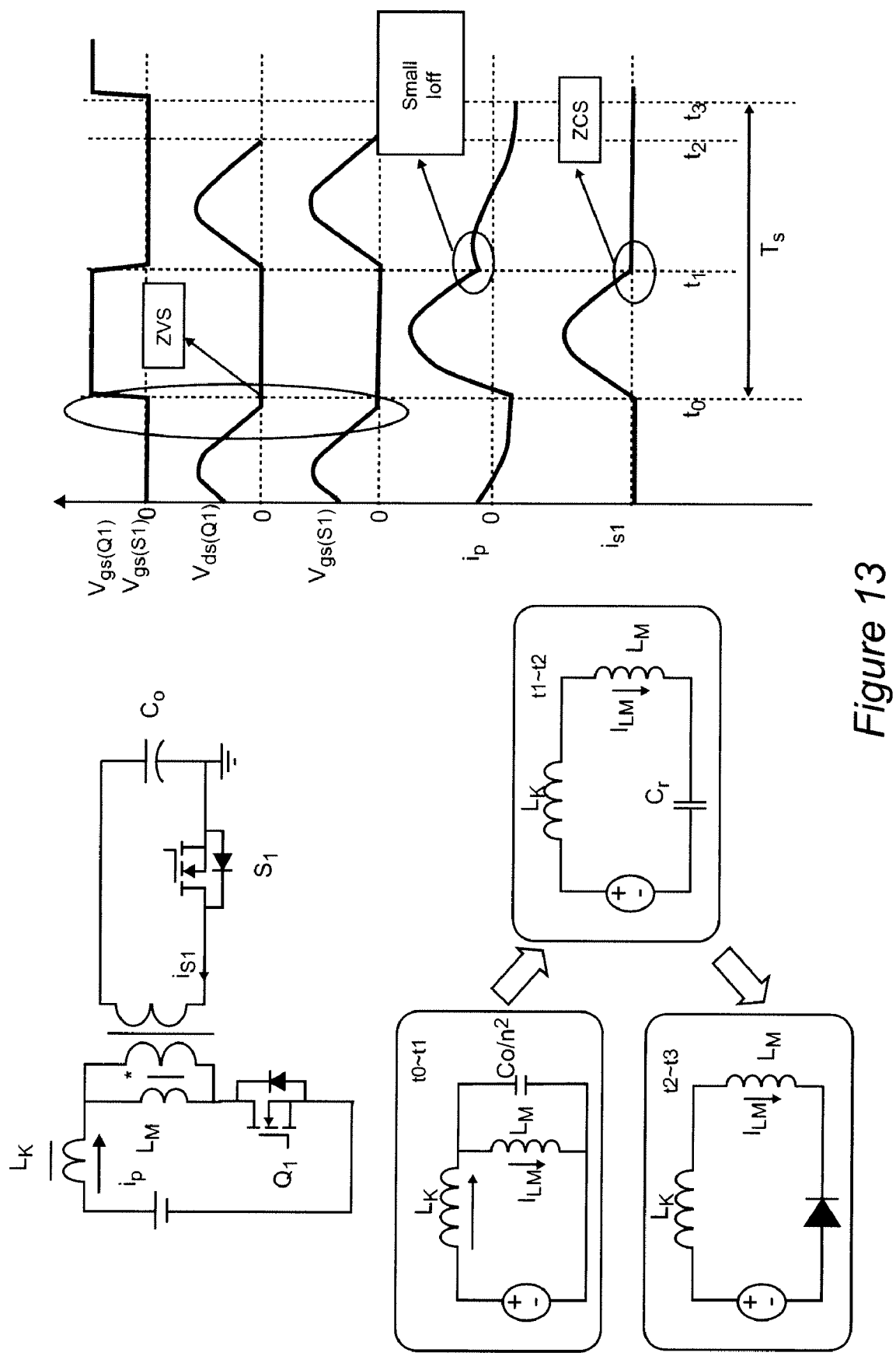
FIG. 13 illustrates operation of the inductor-less resonant forward reset circuit of FIG. 12D which is preferred in a perfecting feature of the invention.
Figure 15:
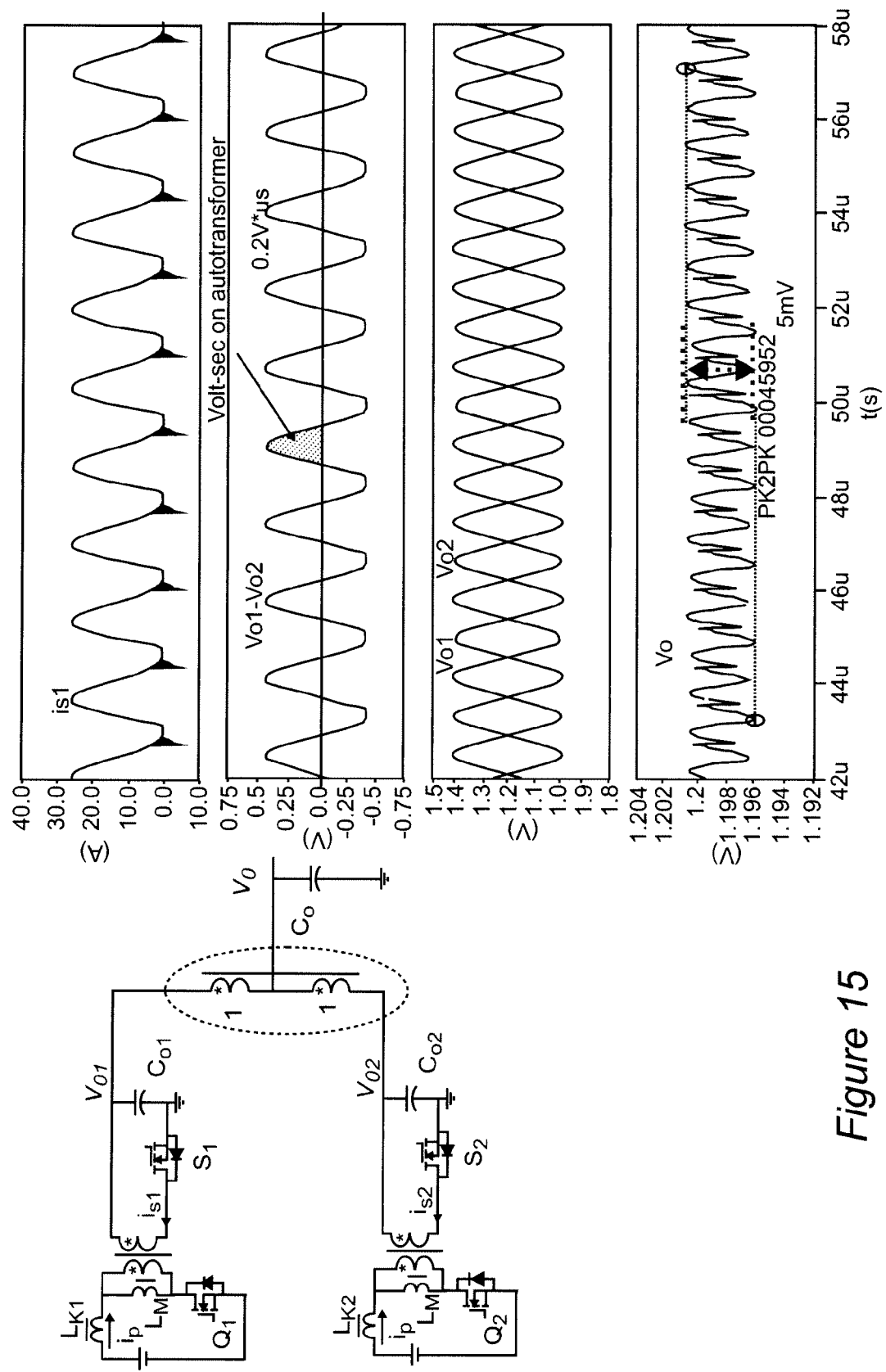
Figure 16:
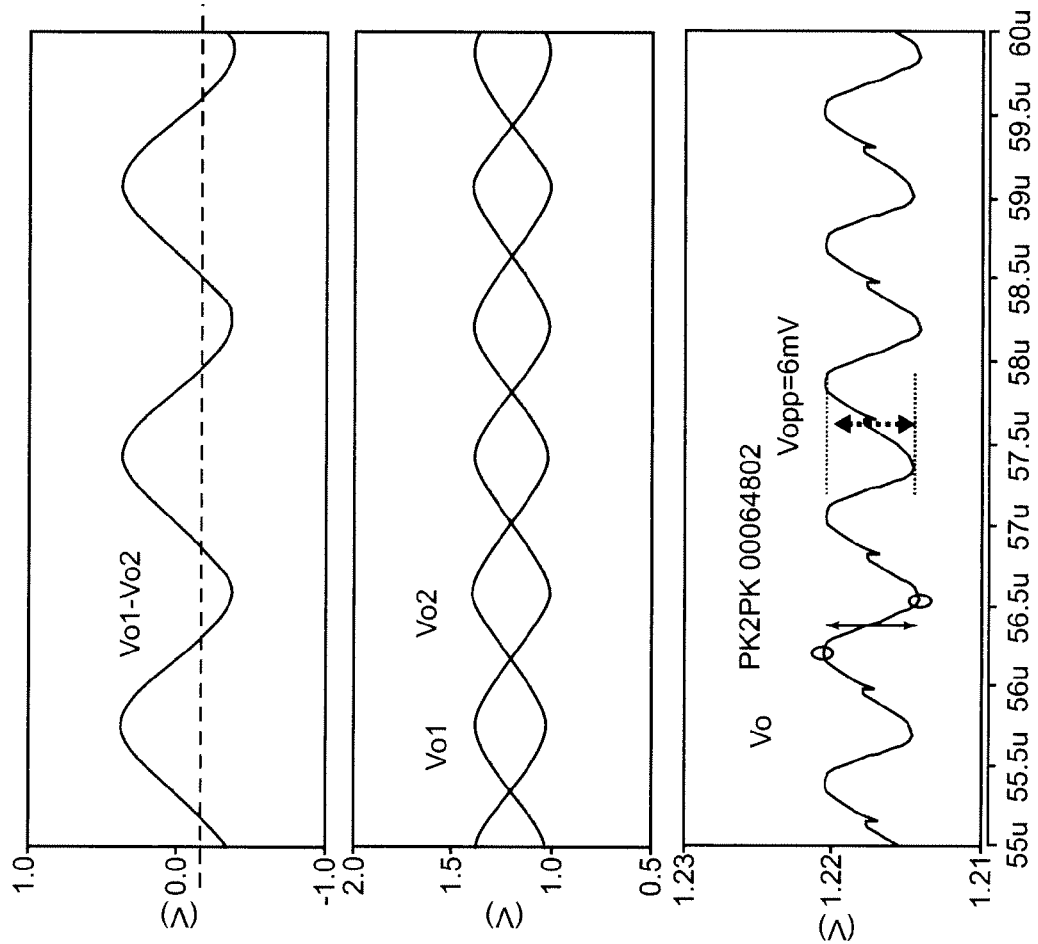
FIG. 16 illustrates a variant form of the perfecting feature of the invention employing non-isolated interleaved inductorless converter circuits.
Figure 16:
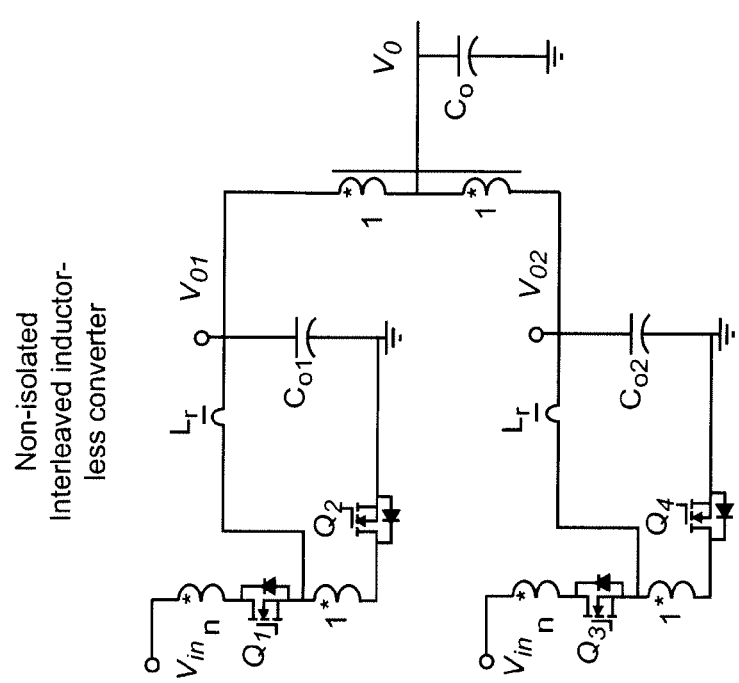

As a solution to such a ripple voltage, in accordance with this perfecting feature of the invention, two or more of the circuits of FIG. 12D can be provided in parallel with their outputs combined by an autotransformer as illustrated in FIG. 15. As further illustrated in FIG. 15, if the parallel-connected circuits are operated with complementary phase switching the respective ripple voltages can be made to approximately cancel each other and reduce the output ripple to about 5 mV, peak-to-peak. It should be noted in this arrangement that the volt-seconds of conduction on the autotransformer is very small and thus it is expected that the autotransformer can be implemented at very small size. It should also be noted that passive current sharing in such a manner supports scalability of the unregulated converters implemented in such a manner; allowing a trade-off between number of phases and current capacity of each inductor-less resonant-reset forward circuit to be optimized for any particular application. Further, such interleaving can also be employed with a plurality of non-isolated inductor-less converters as illustrated in FIG. 16 which are described in detail in U.S. Pat. No. 7,254,047, which is hereby fully incorporated by reference for that purpose.

The above advantageous employment of an inductorless resonant converter is only exemplary of converters which are otherwise unsuitable for use in a final stage of a power supply where high-current, low voltage and accurate voltage regulation are required but which have other advantages which can be exploited within the quasi-parallel regulator architecture in accordance with the invention. Another known class of isolated DC/DC converter of this type is a class of resonant converters such as LLC resonant converters is able to operate over a wide range of input voltages, which is desirable to meet requirements of being able to maintain regulation during short periods of input power interruption. It will be recalled by those skilled in the art that PWM switching converters typically operate at the highest possible fixed frequency which does not cause excessive switching losses and also that PWM converters must have a recovery time during each switching cycle. In general, these factors imply that the duty cycle of switching PWM converters is limited to 50%, a point at which the switching regulator will be most efficient. However, during periods of power input interruption, power is typically supplied from a capacitor operated at a relatively high voltage; which voltage rapidly diminishes when input power is interrupted and, when such an input voltage diminishes, the PWM converter must operate at a higher duty cycle than in normal operation to provide a longer input power interval in order to maintain regulation from a reduced voltage supply. Therefore, the switching voltage converter must be designed to have a duty cycle which is limited to 50% at the lowest voltage the storage capacitor (sometimes referred to as a hold-up capacitor) will reach during an input power interruption under the design specification. Doing so, of course, results in use of a much lower duty cycle, imposing reduced efficiency, during normal operation. For example, in an asymmetrical half bridge (AHB) converter optimally designed for operation at 400 Volts, an efficiency of 94.5% can be obtained. However, when the circuit is designed to operate over an input voltage range of 300 to 400 volts (which is a typical voltage range for accommodation of possible short, i.e. 20 millisecond, power interruptions), the converter efficiency at 400 Volts falls to 92% or less.

Figure 17A:
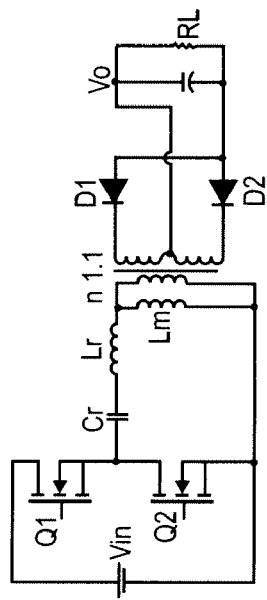
FIGS. 17A and 17B illustrate an exemplary LLC resonant converter in which gain varies or can be made to vary with input power voltage.
Figure 17B:
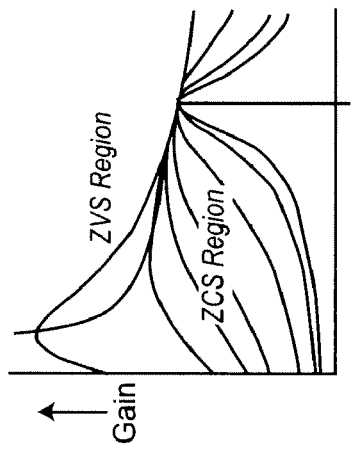

A class of resonant converters which can change gain (e.g. the ratio of output voltage to input voltage) with input voltage is known. These converters operate at a 50% duty cycle regardless of frequency but will be most efficient when switched at a frequency at which they resonate. These converters, an example of which is illustrated in FIG. 17A, are also characterized in that they include a small parasitic magnetizing inductance, Lm, which is negligible above the resonant frequency but participates in resonance with Lr and Cr and provide significant reactance below the resonant frequency. Thus, within limits, the gain will increase as the frequency is reduced as shown in FIG. 17B which allows regulation to be maintained at 50% duty cycle even when the input power voltage is reduced significantly.

Such converters can achieve a voltage conversion ratio (e.g. gain) either greater or less than unity. Moreover, zero voltage switching (ZVS) and relatively small turn-off currents can be achieved at switching frequencies both above and below the series resonant frequency determined by Lr and Cr. By choosing a suitable transformer turns-ratio, the converter can be targeted to operate most efficiently at the nominal input voltage (e.g. 400 Volts). During input power interruption and input power voltage is provided from a hold-up capacitor, the voltage drops and the LLC resonant converter reduces switching frequency to alter gain and thus compensate for the reduced input voltage. Although the frequency change may cause operation far from the resonant frequency and correspondingly reduced efficiency, typically specified hold-up times are only on the order of 20 milliseconds, as noted above, and the reduction of efficiency is not significant either as a matter of power consumption or as presenting a thermal problem.

Since this class of converters can operate at the most efficient, resonant frequency during normal operation, their efficiency can be much higher in comparison with AHB or other PWM topologies by 2% to 3% or greater. Also, since ZVS can be achieved and turn-off currents are comparatively small, switching losses in the primary switches are very low. The secondary side diodes or synchronous rectifiers (SRs) are operated at zero current switching (ZCS) and reverse recovery losses are also correspondingly small. Prototype LLC resonant converters have been built which exhibit 94.5% efficiency at a 1 kW output using diodes and an even greater efficiency of in excess of 96% using synchronous rectifiers.

However, the optimum turn on time of secondary side synchronous rectifiers and primary side switches are not exactly in phase and a separate driving scheme must be employed for the synchronous rectifiers which may be unacceptably complicated. A simple possible driving method would be to sense current in the synchronous rectifiers and control switching when the current falls to zero. However, as a practical matter, such sensing cannot be done due to the unavoidable package inductance of the synchronous rectifier switches. That is, any attempt to determine current by sensing voltage across a SR necessarily senses voltage drop across a series connection of the transistor switch and the series package inductance thereof and the apparent ZCS point, as detected, is strongly phase shifted from the actual ZCS point. That is, the optimal SR drive signal is much shorter than the value expected form measurement or detection of current in the SR.

Furthermore, additional characteristics such as output current limiting, modular paralleling, soft start, and overload protection are often desirable and specified for the converter design. These characteristics cannot be achieved with an LLC resonant converter unless the operating frequency is greatly increased. An operating frequency up to five times the optimal steady state frequency will often be required to achieve such characteristics. Such a high operating frequency will induce prohibitively high switching losses and further complicate the driving of synchronous rectifiers. Thus, it has not been considered feasible to use LLC resonant circuits in final voltage converter stages notwithstanding the clear potential for substantial improvement in efficiency even using a very high input voltage which accommodates hold-up during periods of input power interruption.

Figure 18A:
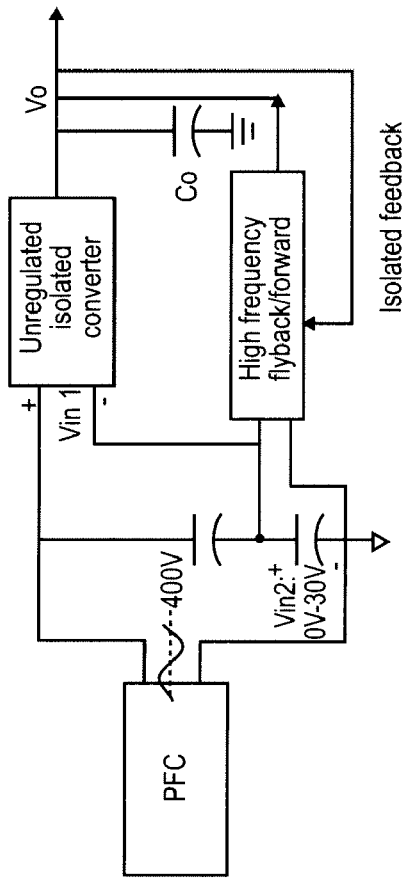
FIGS. 18A and 18B are block diagrams illustrating the application of quasi-parallel or Sigma converter architecture in accordance with the invention to allow advantages of the LLC resonant converter of FIG. 17A to be exploited while avoiding problems that class of converters.
Figure 18B:
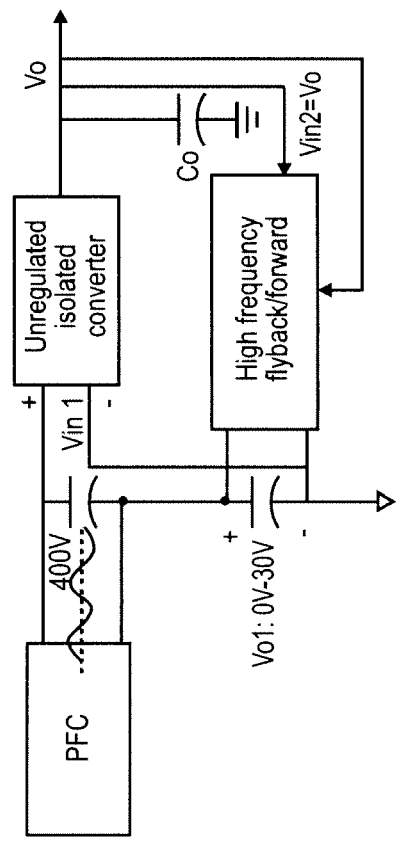

However, the quasi-parallel or Sigma architecture in accordance with the invention allow this potential advantage to be exploited as shown in FIG. 18A or 18B, using LLC resonant converter or converters as the unregulated branch as shown, for example, in FIG. 18A (corresponding to the basic architecture of FIG. 5, described above) or FIG. 18B in which the regulated converter receives power from the output of the unregulated converter and adjusts the voltage input to the unregulated converter which, in turn, alters gain and stabilizes and regulates the output voltage of the unregulated converter, or even the variant quasi-parallel or Sigma architecture of FIG. 11. In any of these architectures, all converters, whether regulated or unregulated, can be treated as voltage sources, as discussed above and the unregulated converters may be arranged to supply most of the output current by suitable adjustment of output impedance relative to the regulated converter.

The architectures shown provides substantial improvement in high efficiency during normal operation. For example, a state of the art 400V DC/DC converter using phase-shift full bridge topology and operating a 200 KHz switching frequency has an efficiency of about 92% whereas, in the Sigma architectures of FIGS. 18A and 18B, the efficiency of the unregulated branch is about 97% at 400 Khz while the efficiency of the regulated branch is about 85%; yielding an overall efficiency of about 96% which is an improvement of 4% over the state of the art DC/DC converter.

The synchronous rectifier driving scheme is also much simplified since the LLC resonant converter will be normally operating at a constant frequency. Loss of efficiency when a reduction in input power voltage causes a change in switching frequency is not important since it occurs only for a short period and does not present thermal problems. The inclusion of a regulated converter in the architecture and additional feedback mechanisms provided thereby allow output current to be easily controlled for modular paralleling, soft start and current limiting/protection. Moreover, when the load is extremely light, the primary side of the unregulated branch can be controlled such that only the regulated converter is operating and thus providing additional light load efficiency. Further, during hold-up time, the frequency of the unregulated LLC resonant converter can be reduced while the regulated converter executes final regulation of the output voltage.

In view of the foregoing, it is seen that the invention provides an improved voltage regulator and power supply architecture capable of improved efficiency with improved transient response and which allows substantial reduction of output capacitor size and cost and which can be implemented with many different types of known or foreseeable types of regulated and unregulated voltage converters. A perfecting feature of the invention using a plurality of inductor-less converters switched in an interleaved fashion to average and substantially cancel the output voltage ripple of respective converters provides enhanced efficiency and overall power supply size reduction. Further, by use of the quasi-parallel or Sigma architecture in accordance with the invention, other types and classes of DC/DC converters which potentially offer some improved characteristics such as substantially increased efficiency but exhibit other unsuitable or impractical properties for a final converter stage (of which the LLC resonant converter is exemplary) can be used as such; allowing exploitation of the improved characteristics while avoiding the associated problems presented.

While the invention has been described in terms of a single preferred embodiment, those skilled in the art will recognize that the invention can be practiced with modification within the spirit and scope of the appended claims.

The invention claimed is:

1. regulator circuit architecture including
   a regulated branch including, at least one regulated voltage converter,
   an unregulated branch including at least one unregulated voltage converter having a lower output impedance than said regulated branch, said unregulated branch being connected in parallel with said regulated branch,
   wherein output impedances of said regulated branch and said unregulated branch determine a proportionate load current delivered to a load from each branch, and
   two power supplies, a first power supply of said two power supplies supplying input power to said regulated branch and a second power supply of said two power supplies supplying input power to said unregulated branch and connected such that variation in input voltage to said unregulated branch due to load current supplied therefrom provides feedback to the regulated branch for voltage regulation of the output voltage of said voltage regulator circuit.

2. The voltage regulator circuit as recited in claim 1, wherein said unregulated branch comprises a plurality of voltage transformers.

3. The voltage regulator circuit as recited in claim 2, wherein said unregulated branch comprises a plurality of unregulated converters which are connected in parallel.

4. The voltage regulator circuit as recited in claim 2, wherein said power supplies to said regulated branch and said unregulated branch are connected in series.

5. The voltage regulator circuit as recited in claim 1, wherein said unregulated branch comprises a plurality of unregulated converters which are connected in parallel.

6. The voltage regulator circuit as recited in claim 1, wherein said power supplies to said regulated branch and said unregulated branch are connected in series.

7. The voltage regulator circuit as recited in claim 1, wherein said regulated branch comprises a buck converter.

8. The voltage converter circuit as recited in claim 1, wherein said unregulated branch comprises an inductorless resonant reset forward circuit.

9. The voltage converter circuit as recited in claim 8, wherein said unregulated branch comprises a plurality of inductorless resonant reset forward circuit operating in a multi-phase, interleaved manner.

10. The voltage converter circuit as recited in claim 1, wherein said unregulated branch comprises, an LLC resonant circuit.

11. A method of regulating voltage of a power supply, said method including steps of
providing power to an unregulated voltage converter from a first source such that increased load causes reduced voltage of said first source in series with a second source,
providing power to a regulated voltage converter from said second source or a third source, and
adjusting an input or output voltage of said regulated voltage converter to compensate for said reduced voltage whereby an output voltage of said power supply is regulated.

12. The method as recited in claim 11, wherein said first source and said second source are connected in series such that said reduced voltage, of said first source causes an increase in voltage of said second source.

13. The method as recited in claim 11, wherein said reduced voltage of said first source is compensated by an increase in voltage at an output of said regulated voltage converter.

14. The method as recited in claim 13, wherein said increase in voltage is derived through feedback from an output of said power supply.

15. The method as recited in claim 11, wherein said first source includes an output of said regulated voltage converter.

* * * * *